United States Patent Office 3,753,966
Patented Aug. 21, 1973

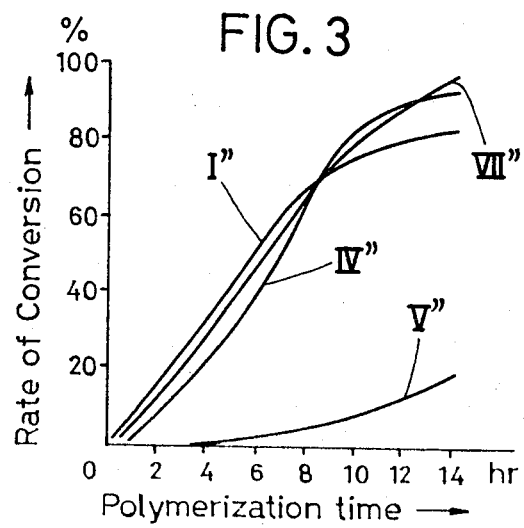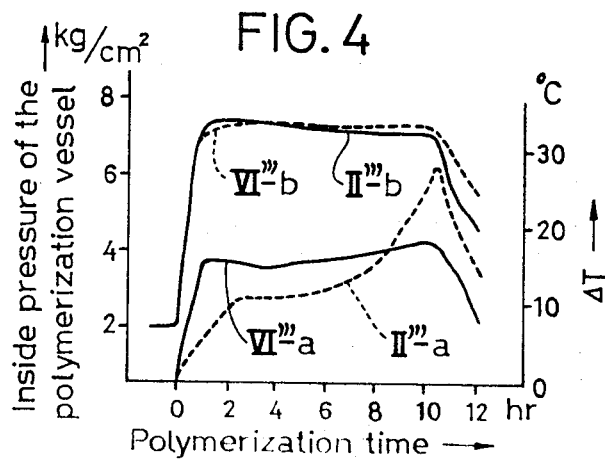

3,753,966
PROCESS FOR PREPARING POLYVINYL CHLO-
RIDE BY SUSPENSION POLYMERIZATION
Shunichi Koyanagi, Hajime Kitamura, Kinya Ogawa, and Kenichi Taguchi, Naoetsu, Japan, assignors to Shinetsu Chemical Company
Filed Dec. 16, 1970, Ser. No. 98,667
Claims priority, application Japan, Dec. 23, 1969,
44/103,005; Dec. 29, 1969, 45/1,310
Int. Cl. C08f 3/22
U.S. Cl. 260—92.8 W    6 Claims

ABSTRACT OF THE DISCLOSURE

The polymerization is conducted in the presence of a first catalyst having the formula:

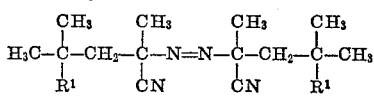

Figure 1:
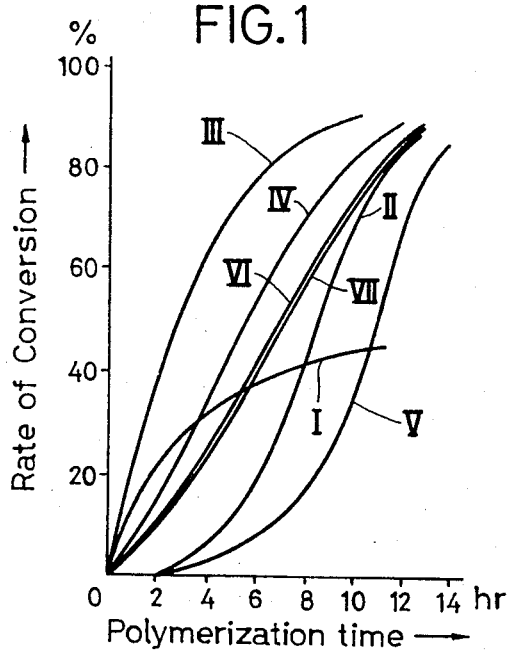

wherein $R^1$ is a radical selected from the group consisting of alkyl, alkoxy and aryl radicals having from 1 to 6 carbon atoms, and a second catalyst selected from the group consisting of azonitriles having the formula:

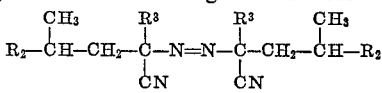

wherein $R^2$ and $R^3$ are each an alkyl radical having from 1 to 4 carbon atoms, and oil-soluble organic peroxides which are soluble in vinyl chloride monomers. A polyvinyl chloride having superior thermal stability and a desirable particle size distribution is obtained quickly and at a high conversion rate. Additionally, polymer scale deposition on the inside wall of the polymerization vessel is reduced.

---

This invention relates to an improved method for preparing vinyl chloride polymer by the suspension polymerization of vinyl chloride or a mixture of vinyl monomers containing vinyl chloride as its main component.

Vinyl chloride is generally polymerized by suspension polymerization. The resultant polymer is insoluble in monomers. Therefore a sudden increase in the reaction rate occurs when the polymerization reaches a high conversion rate, producing an S-shaped reaction curve. This troublesome phenomenon is generally called the "Gel Effect" or "Tromsdorf Effect." As a consequence of this phenomenon, the capacity of the polymerization vessel employed for carrying out the suspension polymerization is determined by the cooling capacity of the vessel at the time at which the rate of conversion is at its highest, in other words when the maximum amount of heat is released. Furthermore, the cooling capacity of the polymerization vessel is determined by the calorific value at the point in the reaction system at which the "Gel Effect" occurs.

Therefore, even if the amount of cooling required by the vessel is much lower before or after that point, one must consider and make allowance for the substantial amount of additional cooling required at said point, in planning the polymerization vessel. This is obviously wasteful.

To prevent the occurrence of the "Gel Effect" during polymerization, it has been proposed that both a high activity catalyst such as diisopropyl peroxydicarbonate, butoxyethyl peroxydicarbonate or acetylcyclohexyl sulfonyl peroxide, and a low activity catalyst, such as lauroyl peroxide or azobisisobutylonitrile be utilized. It was believed that this would make the polymerization rate uniform. However, when this method was put into practice, a large quantity of scale deposited on the inside walls of the polymerization vessel, thereby resulting in a reduction of the cooling capacity of the jacket installed around the polymerization vessel. Further, this scale tended to mix with the product and caused the production of fish eyes therein.

An object of the present invention is to provided a method for suspension polymerizing vinyl chloride, which is free from the above-given disadvantages. The method is characterized in that vinyl chloride or a mixture of vinyl monomers containing vinyl chloride as its main component is polymerized in an aqueous medium containing a suspending agent in the presence of two catalysts, (a) one catalyst is selected from azonitriles (hereinafter referred to as azonitrile A) represented by the general formula:

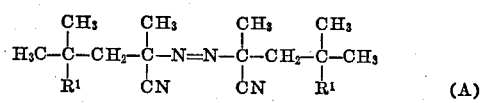 (A)

wherein $R^1$ is a radical selected from the group consisting of alkyl, alkoxy, and aryl radicals having from 1 to 6 carbon atoms, and is exemplified by methyl, ethyl, methoxy, propoxy, butoxy or phenyl, and (b) the other catalyst is selected from the group consisting of (i) azonitriles (hereinafter referred to as azonitrile B) represented by the general formula:

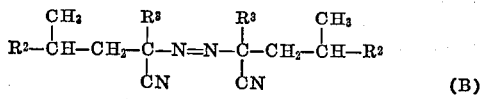 (B)

wherein $R^2$ and $R^3$ are each an alkyl radical having from 1 to 4 carbon atoms, and is exemplified by methyl, ethyl, propyl, butyl, or isobutyl and (ii) oil-soluble organic peroxides which are soluble in vinyl chloride monomers.

The azonitrile A is a high activity catalyst. If it is employed alone, the following unfavorable occurrences result:

(a) Although the initial reaction rate is high, the activity of the catalyst will decrease in the course of polymerization. This makes it impossible for a high rate of conversion to be attained.

(b) The polymer prepared by this method will be colored pale reddish purple, and a will exhibit poor thermal stability.

We have made various studies on the catalysts employed in suspension polymerization of vinyl chloride. We noted that when a catalyst system consisting of azonitrile A and azonitrile B or the so-called oil-soluble organic peroxide which is soluble in monomers is employed, (1) the rate of polymerization reaction is readily made uniform, the "Gel Effect" is eliminated and the total polymerization time is shortened; (2) polymers having superior particle size distribution are prepared without the occurrence of the above-referred to disadvantages (a) and (b); and (3) there is little scale deposition on the inside walls of the polymerization vessel. Moreover, it is easy to control the polymerization temperature. Thus one can eliminate the wasteful use of a polymerization vessel having a larger capacity than is actually required.

It is well known that the oil-soluble organic peroxides decompose readily in the presence of alkali and that their catalytic activities are thereby rapidly reduced. Azonitriles A and B, however, do not decompose in an alkaline aqueous medium. Therefore, if the combination of azonitrile B and azonitrile A is to be used, the aqueous medium had best be kept alkaline. As a result, scale deposition will be reduced.

The azonitrile A employed in the practice of the method of the present invention is exemplified by 2,2′-azobis-4-methoxy-2,4-dimethylvaleronitrile,
2,2′-azobis-2,4,4-trimethylvaleronitrile,
2,2′-azobis-4-ethoxy-2,4-dimethylvaleronitrile,
2,2′-azobis-4-propoxy-2,4-dimethylvaleronitrile,
2,2′-azobis-4-butoxy-2,4-dimethylvaleronitrile, and
2,2′-azobis-4-phenyl-2,4-dimethylvaleronitrile.

The azonitrile B, which is employed in combination with the azonitrile A, is exemplified by 2,2′-azobis-2,4-dimethylvaleronitrile,
2,2′-azobis-2,4-dimethylcapronitrile, and
2,2′-azobis-2-isobutyl-4-methyl-valeronitrile.

The oil-soluble organic peroxide is exemplified by acylsulfonyl peroxide such as acetylcyclohexylsulfonyl peroxide; dialkylperoxy dicarbonate such as diisopropylperoxy dicarbonate; diacyl peroxide such as lauroyl peroxide; and peroxy ester such as tertiary butyl peroxypivalate.

It is advisable that the ratio of (a) azonitrile A to (b) azonitrile B or said oil-soluble organic peroxide be in the range of from 1:10 to 10:1, because such catalyst mixtures evidence the above-mentioned desirable effects to a high degree. The actual choice of the specific ratio of the catalysts employed depends upon the kinds of azonitriles and/or the oil-soluble organic peroxide employed. However, the specific ratio selected should be within said range of 1:10–10:1. The total amount of catalysts employed should be from 0.005 to 0.5% by weight, preferably from 0.01 to 0.1% by weight, based on the amount of vinyl chloride or of the mixture of vinyl monomers containing vinyl chloride as its main component, which is to be polymerized, When an oil-soluble organic peroxide is used as one of the catalysts in practicing the method of the invention, in selecting the kind of organic peroxide to be used the polymerization temperature should be taken into account. For example, if the polymerization temperature is in the range of from 30° to 50° C., a peroxide having an activity high enough for its half life in toleune, at 60° C., to be 0.05 to 10 hours should be chosen; and if the polymerization temperature is in the range of from 50° to 70° C., a peroxide having a half-life of from 10 to 100 hours (a low activity catalyst) is preferable. In this case, the polymerization may be started in the presence of only the azonitrile A and the oil-soluble organic peroxide is added before the rate of conversion attains 50%. This method is particularly recommended when an oil-soluble organic peroxide having high activity, such as for example acetylcyclohexyl sulfonyl peroxide or diisopropylperoxy dicarbonate, is used.

Except for the catalyst employed the suspension polymerization is carried out by the known method. As the suspending or dispersion-stabilizing agent, any one or more of the following members can be employed: synthetic high molecular substances such as polyvinyl alcohol, methyl cellulose, polyvinyl pyrrolidone, polyvinyl methylether and a copolymer of vinyl acetate with maleic anhydride; and water-insoluble inorganic substances such as tricalcium phosphate, calcium oxalate, barium sulfate and bentonite. To carry out the polymerization, vinyl chloride or a mixture of monomers containing vinyl chloride as its main component is dispersed in an aqueous medium with the aid of agitation, and heated at a temperature between 30° and 70° C. The catalysts are contained or dissolved in the aqueous medium. When the two kinds of azonitriles A and B, respectively represented by the general formulae (A) and (B), are employed as the polymerization catalysts, it is advisable to adjust the pH of the polymerization system to within the range of from 8 to 11. An alkali such as caustic soda, caustic potash or calcium hydroxide may be employed for this purpose.

The method of the instant invention is also applicable to the copolymerization of vinyl chloride and monomers which are copolymerizable therewith. Said vinyl monomers copolymerizable with vinyl chloride are exemplified by vinyl ester, vinyl ether, acrylic acid, methacrylic acid and esters thereof, aromatic vinyl monomer, maleic acid and anhydrides thereof, vinylidenehalide, vinyl halide (with the exception of vinyl chloride) and α-olefin.

The abbreviations utilized in the following examples are defined below:

Azonitriles A:
  DMVN–(A–1): 2,2′-azobis-2,4,4-trimethylvaleronitrile
  DMVN–(A–2): 2,2′-azobis-4-methoxy-2,4-dimethylvaleronitrile
  DMVN–(A–3): 2,2′-azobis-4-ethoxy-2,4-dimethylvaleronitrile
  DMVN–(A–4): 2,2′-azobis-4-butoxy-2,4-dimethylvaleronitrile
  DMVN–(A–5): 2,2′-azobis-4-phenyl-2,4-dimethylvaleronitrile
Azonitriles B:
  DMVN–(B–1): 2,2′-azobis-2,4-dimethylvaleronitrile
  DMCN–(B–2): 2,2′-azobis-2,4-dimethylcapronitrile
Oil-soluble organic peroxides:
  ACSP: Acetylcyclohexylsulfonyl peroxide
  IPP: Diisopropylperoxy dicarbonate
  LPO: Lauroyl peroxide

EXAMPLE 1

20 ml. of water and 10 mg. of polvinyl alcohol were placed into each pressure-proof glass test tube (capacity: 50 ml.). The solution was mixed with each one of the following catalysts: (1) 3 mg. of DMVN-(A–1), (2) 3 mg. of DMVN–(B–1), (3) 3 mg. of ACSP, (4) 3 mg. of IPP, (5) 10 mg. of LPO, (6) a mixture of 1 mg. of DMVN–(A–1) and 2 mg. of DMVN–(B–1), and (7) a mixture of 2 mg. of DMVN–(A–1) and 4 mg. of LPO. Ten tubes were prepared of each formulation. The tubes were then cooled in Dry Ice-methanol at a temperature below −20° C. After which 10 g. of vinyl chloride monomer were added to each tube and the air in the tube was replaced by nitrogen gas. The tube was sealed by melting.

The sealed tubes were placed in a thermo water bath and polymerization was carried out at 55° C. During the polymerization the tubes were tumbled over at the rate of 100 r.p.m.

At certain intervals starting from the beginning of the polymerization, the tubes were taken out one by one, then cooled in Dry Ice-methanol at a temperature below −20° C. The tubes were then opened so that the polyvinyl chloride prepared could be dried and its yield determined. The relationship between the rate of conversion of the vinyl chloride and the polymerization time was as shown in FIG. 1. When only DMVN–(A–1) was used as the polymerizing catalyst, as shown by curve I in the figure, its activity was lost in the course of the polymerization. When only DMVN–(B–1) was used as the polymerizing catalyst, an induction period was observed to occur (cf. curve II) and the "Gel Effect" was not eliminated. When ACSP or IPP alone was used, as shown respectively by curves III and IV, the reaction rate was too fast in the early stage of the polymerization. When LPO was used alone, there was a long induction period (cf. curve V) before the initiation of polymerization. The curve representing the rate of conversion was S-shaped and the "Gel Effect" could not be controlled. Consequently, one could not obtain in any of these cases the desired uniform reaction rate. A uniform reaction rate was observed to take place only when the combination of DMVN–(A–1) and DMVN–(B–1) or that of DMVN–(A–1) and LPO was used as the catalyst. As is shown by curves VI and VII, with the use of the combination of catalysts the induction period and the "Gel Effect" were both eliminated.

EXAMPLE 2

Figure 2:
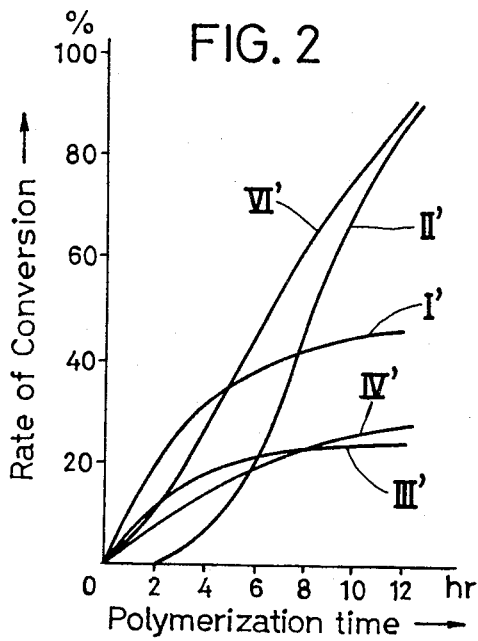

5 mg. of NaOH was added to each of the formulations corresponding to curves I–IV and VI, described in Example 1 and polymerization was carried out. FIG. 2 shows the relationship between the rate of conversion and the polymerization time. In FIG. 2, curves I'–IV' and VI' respectively correspond to curves I–IV and VI.

As shown by curves III' and IV' in the figure, catalysts ACSP and IPP were decomposed by the alkali. As a result the activity of the catalysts was rapidly reduced and the desired polymerization was not attained. In contrast thereto, DMVN–(A–1) and DMVN–(B–1) were not decomposed by alkali, and as shown by curve VI', their combined use enables one to realize the advantages of the present invention even though the polymerization is conducted in an aqueous alkaline medium.

EXAMPLE 3

20 ml. of water having 10 mg. of polyvinyl alcohol dissolved therein were placed in each of the sealed pressure-proof glass tubes described in Example 1. Then a mixture of 8 mg. of DMVN–(A–1) and 4 mg. of DMVN–(B–1) or 12 mg. of DMVN–(A–1) or 12 mg. of DMVN–(B–1) was added to each tube. The tubes were then cooled in Dry Ice-methanol at a temperature below −20° C. 10 g. of vinyl chloride monomer were added to each tube, and as the air inside the sealed tubes was replaced by nitrogen gas, they were sealed by melting. The sealed tubes were placed into a thermo water bath, kept at 45° C.±0.1° C., and polymerization was carried out for 6 hours. During the polymerization the tubes were tumbled at the rate of 100 r.p.m. Subsequently the sealed tubes were taken out of the bath, cooled in Dry Ice-methanol at a temperature below −20° C., opened, and the polyvinyl chloride prepared by the reaction was dried, so that the rate of conversion could be ascertained. The results obtained are given in Table 1 below.

TABLE 1

| Catalyst: | Rate of conversion (percent) |
|---|---|
| DMVN–(A–1) only | 61.0 |
| DMVN–(B–1) only | 20.5 |
| Combination of DMVN–(A–1) and DMVN–(B–1) | 80.0 |

EXAMPLE 4

20 ml. of water and 10 mg. of polyvinyl alcohol were placed in each pressure-proof glass test tube (capacity: 50 ml.). To the solution, each one of (1) 10 mg. of DMVN–(A–1), (2) 10 mg. of IPP, (3) 10 mg. of LPO, and (4) a mixture of 5 mg. of DMVN–(A–1) and 5 mg. of IPP was added. Ten tubes were prepared of each formulation. Then they were cooled in Dry Ice-methanol at a temperature below −20° C., after which 10 g. of vinyl chloride monomer were added to each tube. The air inside each tube was replaced by nitrogen gas and the tubes were sealed by melting. Subsequently, the sealed tubes were placed in a thermo water bath, and the polymerization was carried out at 40° C.±0.1° C. During the polymerization the tubes were tumbled at the rate of 100 r.p.m. At certain intervals, starting from the beginning of the polymerization, the tubes were taken out of the bath one by one, cooled in Dry Ice-methanol at a temperature below −20° C., then opened so that the polyvinyl chloride thus prepared could be dried and its yield determined. The relation between the rate of conversion and the polymerization time was as shown in FIG. 3. As is shown by curve I'' of FIG. 3, when only DMVN–(A–1) was used as the catalyst, the activity of the catalyst was rapidly reduced toward the end of the polymerization. As a result a high conversion could not be attained. When only IPP was used as the catalyst, the curve for the rate of conversion was S-shaped (cf. curve IV''). The use of LPO alone gave curve V'' which shows that the rate of polymerization was so low that the rate of conversion, even 12 hours after the start of the polymerization, was no more than 12%. It was only when the combination of DMVN–(A–1) and IPP was used that a pure white polymer was obtained in a high yield by uniform reaction rate as shown by cure VII'', with no "Gel Effect."

EXAMPLE 5

250 g. of polyvinyl alcohol, 500 liters of water and 75 g. of DMVN–(B–1) as the catalyst were placed into a stainless steel polymerization vessel having a capacity of 1 m.$^3$. The inside of the polymerization vessel was placed under vacuum then 250 kg. of vinyl chloride monomer were added to the vessel. The contents of the vessel were stirred and the polymerization was carried out at 50° C. In a similar polymerization vessel containing the same amounts of polyvinyl alcohol and water, were placed, as catalysts, 25 g. of DMVN–(A–1) and 50 g. of DMVN–(B–1), and polymerization was carried out at 50° C. The inside pressure of the polymerization vessel during the course of polymerization and the difference in temperature, ΔT, between the temperature within the polymerization vessel and the temperature in the cooling jacket, were measured. Their changes with the lapse of time were as shown in FIG. 4: viz, when, as shown by curve II'', DMVN–(B–1) alone was employed as the catalyst, the maximum ΔT was 23° C. When DMVN–(A–1) was employed together with DMVN–(B–1), ΔT became approximately constant one hour after the start of the polymerization, and its maximum value was not more than 18° C.

The curves in FIG. 4 show the following:

II'''–a: ΔT, when only DMVN–(B–1) was used as the catalyst.

II'''–b: Pressure inside the polymerization vessel, when only DMVN–(B–1) was used as the catalyst.

VI'''–α ΔT, when DMVN–(A–1)+DMVN–(B–1) were used as catalysts.

VI'''–b: Pressure inside the polymerization vessel, when DMVN–(A–1)+DMVN–(B–1) were used as catalysts.

EXAMPLE 6

Experiments similar to those described in Example 5 were conducted, the only difference being that the catalysts employed were as given in Table 2. The polymerization time required and the maximum ΔT obtained were as given in Table 2. It is to be noted that the polymerization time is the length of time from the start of polymerization until the point at which the inside pressure of the polymerization vessel became 4 kg./cm.$^2$.

EXAMPLE 7

250 g. of polyvinyl alcohol, 500 liters of water and catalysts as given in Table 3 (percent by weight based on the weight of monomer to be added) were placed into a stainless steel polymerization vessel having a capacity of 1 m.$^3$. The inside of the polymerization vessel was placed under vacuum. Then 250 kg. of vinyl chloride monomer was added to the vessel contents. Polymerization was carried out while stirring and at a temperature as given in Table 3. The results obtained are also shown in said Table 3.

TABLE 2

| Catalysts | | | | | | |
|---|---|---|---|---|---|---|
| | DMVN–(A–2), 28 g. | DMVN–(A–3), 31 g. | DMVN–(A–4), 35 g. | DMVN–(A–5), 36 g. | DMVN–(A–1), 25 g. | DMVN–(A–2), 28 g. |
| | DMVN–(B–1), 50 g. | DMVN–(B–1), 50 g. | DMVN–(B–1), 50 g. | DMVN–(B–1), 50 g. | DMCN–(B–2), 56 g. | DMCN–(B–2), 56 g. |
| Polymerization time (hr.) | 12.3 | 13.0 | 12.5 | 13.5 | 12.2 | 12.5 |
| Maximum ΔT (° C.) | 16.0 | 18.0 | 19.0 | 20.0 | 18.2 | 17.0 |

TABLE 3

| Experiment No. | 1 | 2 | 3 | 4 | 5 | 6 | 7 | 8 | 9 | 10 | 11 |
|---|---|---|---|---|---|---|---|---|---|---|---|
| | Control | | | | Present invention | | | | | | |
| Catalyst (percent) | DMVN-(A-1) (0.05) | IPP (0.05) | ACSP (0.05) | LPO (0.1) | DMVN-(A-1) (0.02) IPP (0.02) | DMVN-(A-1) (0.02) ACSP (0.02) | DMVN-(A-2) (0.02) ACSP (0.02) | DMVN-(A-4) (0.02) ACSP (0.02) | DMVN-(A-1) (0.02) LPO (0.03) | DMVN-(A-2) (0.02) LPO (0.03) | DMVN-(A-4) (0.02) LPO (0.03) |
| Polymerization condition: | | | | | | | | | | | |
| Polymerization temp. (°C) | 40 | 40 | 40 | 55 | 40 | 40 | 40 | 40 | 55 | 55 | 55 |
| Polymerization time (hr.) | 20.0 | 18.0 | 15.0 | 14.0 | 21.5 | 19.5 | 20.5 | 22.5 | 18.5 | 14.0 | 14.5 |
| Results of the polymerization: | | | | | | | | | | | |
| ΔT (°C) (Note) | 15.0 | 14.0 | 13.0 | 18.0 | 14.5 | 15.0 | 15.5 | 16.0 | 8 | 10 | 11 |
| Amount of scale (g./m.²) | 80 | 220 | 350 | 150 | 85 | 90 | 110 | 115 | 120 | 123 | 128 |
| Color | Pale yellow | None | None | None | None | None | None | None | None | None | None |
| Gelling time (min.) | 15.0 | 17.0 | 18.0 | 18.0 | 16.0 | 15.0 | 15.0 | 15.0 | 15.0 | 15.0 | 15.0 |
| Fish eye | 6 | 30 | 40 | 25 | 10 | 12 | 15 | 16 | 17 | 18 | 20 |
| Particle size distribution (percent): | | | | | | | | | | | |
| 60 mesh thru | 98.9 | 97.6 | 96.0 | 97.8 | 97.4 | 98.3 | 98.2 | 97.8 | 97.3 | 97.5 | 98.9 |
| 80 mesh thru | 91.0 | 92.1 | 92.3 | 89.0 | 89.5 | 90.6 | 90.2 | 90.1 | 88.5 | 89.6 | 90.0 |
| 100 mesh thru | 74.5 | 73.5 | 70.5 | 74.5 | 73.1 | 74.3 | 73.2 | 73.9 | 73.6 | 72.5 | 74.2 |
| 110 mesh thru | 28.4 | 21.8 | 35.3 | 33.2 | 32.6 | 35.1 | 33.4 | 33.2 | 31.0 | 30.5 | 36.1 |
| 150 mesh thru | 7.3 | 12.7 | 18.6 | 4.5 | 4.2 | 4.1 | 4.5 | 4.0 | 3.9 | 4.0 | 6.2 |
| 200 mesh thru | 2.1 | 2.2 | 3.2 | 2.0 | 2.0 | 2.3 | 2.5 | 2.1 | 1.9 | 2.2 | 2.5 |

Note.—ΔT = Maximum difference in the course of polymerization, between the temperature inside the polymerization vessel and that of the jacket; Color=100 parts of polymer, 1 part of tribasic lead sulfate, 1.5 parts of lead stearate, and 0.7 part of barium stearate were mixed and kneaded on rolls at 160° C. for 7 minutes and formed into a sheet. The color of the polymer was determined by observing the appearance of the sheet; Gelling time=65 g. of the mixture of the components in the same ratio as given above was put in a Brabender plastograph equipped with a mixing chamber (capacity: 50 ml.), and were kneaded therein at 185° C. The time (min.) elapsed after the start of the kneading until the mixture showed the maximum torque to kneading was employed to denote the gelling time of the polymer; Fish eye=100 parts of the polymer, 50 parts of dioctyl phthalate, 2.0 parts of dibutyltin maleate, 0.2 part of barium stearate, and 0.05 part of carbon were kneaded on rolls at 150° C. for 7 minutes and formed into a sheet. The number of fish eyes per 100 cm.² of the sheet, as observed with the naked eye, was employed to show the fish eye value of the polymer.

EXAMPLE 8

250 g. of polyvinyl alcohol, 500 liters of water, 25 g. of DMVN-(A-3) as a catalyst, and 250 kg. of vinyl chloride were placed into a polymerization vessel similar to the one described in Example 5. While the contents of the vessel were stirred, polymerization was started at 55° C. During the course of the polymerization and 4 hours after polymerization was initiated, 50 g. of a 50% solution of IPP in toluene were added to the vessel. Another experiment was conducted similar to the one just described, excepting that the catalyst employed was 100 g. of a 50% solution of IPP in toluene, and the entire quantity of IPP was added at the start of the polymerization. In both vessels, the polymerization was carried out at 55° C. The results obtained were as given in Table 4.

TABLE 4
Polymerization conditions

| | Catalyst | |
|---|---|---|
| | DMVN-(A-3) plus IPP | IPP only |
| | Polymerization time (hr.) | |
| | 10.5 | 10.0 |
| Results of the polymerization | | |
| Amount of scale deposited (g./m.²) | 93 | 460 |
| Fish eye | 5 | 13 |
| Particle size distribution (percent): | | |
| 60 mesh thru | 98.9 | 97.0 |
| 80 mesh thru | 90.0 | 92.0 |
| 100 mesh thru | 75.2 | 73.0 |
| 115 mesh thru | 33.5 | 22.8 |
| 150 mesh thru | 4.6 | 13.8 |
| 200 mesh thru | 2.0 | 2.8 |

What is claimed is:

1. In a method for the suspension polymerization of vinyl chloride or a mixture of vinyl monomers containing vinyl chloride as its main component, the improvement which comprises conducting the polymerization in the presence of a catalyst having the general formula:

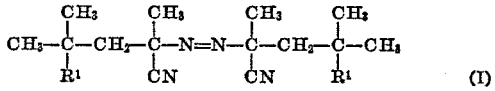

(I)

wherein $R^1$ is a radical having from 1 to 6 carbon atoms selected from the group consisting of alkyl, alkoxy and aryl, and a second catalyst selected from the group consisting of an azonitrile having the general formula:

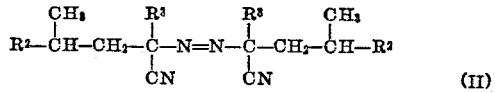

(II)

wherein $R^2$ and $R^3$ are each an alkyl radical having from 1 to 4 carbon atoms and an oil-soluble organic peroxide which is soluble in a vinyl chloride monomer, said catalysts of the Formulas I and II being present in a total amount of from 0.005 to 0.5% by weight, based on the amount of the vinyl chloride or the mixture of vinyl monomers containing vinyl chloride as its main component, said catalysts (I) and (II) being present in a catalyst ratio of 1:10 to 10:1, said polymerization being conducted in the simultaneous presence of the catalysts (I) and (II) or in the presence of catalyst (I) followed by addition of the catalyst (II) before the rate of conversion attains 50%.

2. The method as claimed in claim 1, wherein the total amount of the catalyst (I) and (II) present is 0.01 to 0.1% by weight.

3. The method as claimed in claim 1 wherein the second catalyst is the azonitrile having the general Formula II.

4. The method as claimed in claim 1 wherein the second catalyst is said oil-soluble organic peroxide.

5. The method as claimed in claim 3 wherein said polymerization is carried out in an aqueous medium having a pH of from 8 to 11 and containing a suspending agent.

6. The method as claimed in claim 4 wherein the oil-soluble organic peroxide is added after the polymerization begins and before the conversion exceeds 50%, the oil-soluble organic peroxide acting to complete the polymerization.

References Cited

UNITED STATES PATENTS

| 2,576,720 | 11/1957 | Marks | 260—92.8 W |
|---|---|---|---|
| 2,975,162 | 3/1961 | Iloff | 260—92.8 W |
| 3,205,204 | 9/1965 | Heckmaier et al. | 260—92.8 W |
| Re. 25,763 | 4/1965 | Marous et al. | 260—92.8 W |
| 3,592,800 | 7/1971 | Oschmann | 260—92.8 W |

JOSEPH L. SCHOFER, Primary Examiner

R. S. BENJAMIN, Assistant Examiner

U.S. Cl. X.R.

260—78.5 BB, 86.3, 87.5 R, C, G, 87.7